US012621216B2

(12) United States Patent
Van Gheluwe et al.

(10) Patent No.: US 12,621,216 B2
(45) Date of Patent: May 5, 2026

(54) METHOD OF CONFIGURING A DEVICE THAT IS TO BE ADDED TO A WIRELESS NETWORK SYSTEM

(71) Applicant: SIGNIFY HOLDING B.V., Eindhoven (NL)

(72) Inventors: Jochen Renaat Van Gheluwe, Lommel (BE); Bartel Marinus Van De Sluis, Eindhoven (NL); Dirk Valentinus Rene' Engelen, Heusden-Zolder (BE); Anthonie Hendrik Bergman, Nuenen (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/271,418

(22) PCT Filed: Aug. 27, 2019

(86) PCT No.: PCT/EP2019/072820
§ 371 (c)(1),
(2) Date: Feb. 25, 2021

(87) PCT Pub. No.: WO2020/043713
PCT Pub. Date: May 3, 2020

(65) Prior Publication Data
US 2021/0336860 A1 Oct. 28, 2021

(30) Foreign Application Priority Data
Aug. 30, 2018 (EP) ..................................... 18191704

(51) Int. Cl.
*H04L 12/24* (2006.01)
*G06F 3/0484* (2022.01)
(Continued)

(52) U.S. Cl.
CPC ............ *H04L 41/22* (2013.01); *G06F 3/0484* (2013.01); *H04L 41/0803* (2013.01)

(58) Field of Classification Search
CPC .... H04L 41/22; H04L 41/0803; G06F 3/0484
See application file for complete search history.

(56) References Cited

U.S. PATENT DOCUMENTS 10,397,013 B1 * 8/2019 Hill ........................ H04L 12/281
10,706,456 B2 * 7/2020 Goodwin ........... G06Q 30/0641
(Continued)

FOREIGN PATENT DOCUMENTS

WO 2017042027 A1 3/2017

*Primary Examiner* — Stephen S Hong
*Assistant Examiner* — Darrin Hope

(57) ABSTRACT

A method (500) of configuring a device that is to be added to a wireless network system is disclosed. The method (500) comprises: receiving (502) a signal indicative of that the device has been ordered by a user, receiving (504) device information about the ordered device, wherein the device information comprises at least information indicative of a type of the ordered device, generating (506) a virtual counterpart of the ordered device based on the device information, storing (508) the virtual counterpart in a memory, receiving (510), at a system controller of the wireless network system, one or more wireless signals from a newly added device that has been added to the wireless network system, wherein the one or more wireless signals are indicative of device information of the newly added device, wherein the device information of the newly added device comprises at least information indicative of a type of the newly added device, comparing (512) the device information of the newly added device with the device information of the ordered device to determine if the device information of the newly added device corresponds with the device information of the ordered device, and, if the device information of the newly added device corresponds with the
(Continued)

502
504
506
508
510
512
514

500 device information of the ordered device, associating (514) the virtual counterpart with the newly added device.

9 Claims, 5 Drawing Sheets

(51) Int. Cl.
 *H04L 41/0803* (2022.01)
 *H04L 41/22* (2022.01)

(56) References Cited

U.S. PATENT DOCUMENTS

| 2007/0177178 | A1* | 8/2007 | Miyata ................... | G06F 3/1229 |
| | | | | 358/1.15 |
| 2010/0268803 | A1* | 10/2010 | Calippee ............. | H04L 41/0843 |
| | | | | 370/254 |
| 2011/0231559 | A1* | 9/2011 | Yamaguchi ........... | H04W 48/20 |
| | | | | 709/228 |
| 2013/0191883 | A1* | 7/2013 | Tung ..................... | H04W 12/08 |
| | | | | 726/4 |
| 2013/0318343 | A1 | 11/2013 | Bjarnason et al. | |
| 2014/0282937 | A1 | 9/2014 | Farber | |
| 2016/0036638 | A1 | 2/2016 | Campbell et al. | |
| 2016/0055469 | A1* | 2/2016 | Kim .................... | H04L 41/0816 |
| | | | | 705/21 |
| 2016/0142417 | A1* | 5/2016 | Farber .................. | H04W 12/50 |
| | | | | 726/6 |
| 2016/0285979 | A1* | 9/2016 | Wang ................... | H04L 67/125 |

* cited by examiner

400 —

402 —

500

METHOD OF CONFIGURING A DEVICE THAT IS TO BE ADDED TO A WIRELESS NETWORK SYSTEM

CROSS-REFERENCE TO PRIOR APPLICATION

This application is the U.S. National Phase application under 35 U.S.C. § 371 of International Application No. PCT/EP2019/072820, filed on Aug. 27, 2019, which claims the benefit of European Patent Application No. 18191704.8, filed on Aug. 30, 2018. This application is hereby incorporated by reference herein.

FIELD OF THE INVENTION

The invention relates to a method of configuring a device that is to be added to a wireless network system, and to a computer program product for executing the method. The invention further relates to a wireless network system for configuring a device that is to be added to the wireless network system.

BACKGROUND

With the emergence of the Internet of Things (IoT) the number of smart home systems is increasing. These (wireless) smart home systems enable users to control devices with their smartphones, based on their position in the home, based on sensor inputs, etc. Examples of these devices include connected lighting devices, home assistant devices, sensor devices such as cameras, presence sensors and temperature/light sensors, connected door locks, connected thermostats, etc. If a user decides to expand his or her smart home system with one or more new devices, these devices need to be added to the wireless network system, and they need to be configured/commissioned. Typically, this commissioning and/or configuration is performed by means of a personal device of the user, such as a smartphone or a tablet pc. An application that runs on the personal device communicates with the newly added device (either directly or indirectly via a hub, router or bridge), and configures/commissions the device accordingly. This can be a cumbersome step for the user, as it is desired that the newly added device immediately works without delay.

US 20140282937 A1 discloses that a device newly introduced to a network is automatically credentialed to be able to communicate over a network before the device first communicates with the network. For example, at a point of purchase, a user can provide network identification information to a merchant computing device that effects transfer of that information to the new device such that the new device can communicate directly with the net-work without initial credentialing directly between the unique device and the local network.

SUMMARY OF THE INVENTION

When a user orders a new device online or in a (physical) store, the user has to add the device to his or her home system and configure it. The user can only configure the (pre-)ordered device once it has been added to/installed in the wireless (home) network. The inventors have realized that it may be desirable that a virtual version of a to-be-installed device is already added to the wireless (home) network before it has been received or installed by the user. This enable a user to configure/commission the new device before installation. This may further improve the process of the installation of the new device, as the wireless (home) system can take the necessary preparations for the new device (e.g. updating/downloading/installing software or firmware associated with the device). It is therefore an object of the present invention to improve the installation of a device in a wireless (home) network system.

According to a first aspect of the present invention, the object is achieved by a method of configuring a device that is to be added to a wireless network system, the method comprising:

receiving a signal indicative of that the device has been ordered by a user, receiving device information about the ordered device, wherein the device information comprises at least information indicative of a type of the ordered device, generating a virtual counterpart of the ordered device based on the device information, storing the virtual counterpart in a memory, receiving, at a system controller of the wireless network system, one or more wireless signals from a newly added device that has been added to the wireless network system, wherein the one or more wireless signals are indicative of device information of the newly added device, wherein the device information of the newly added device comprises at least information indicative of a type of the newly added device, comparing the device information of the newly added device with the device information of the ordered device to determine if the device information of the newly added device corresponds with the device information of the ordered device, and if the device information of the newly added device corresponds with the device information of the ordered device, associating the virtual counterpart with the newly added device.

By generating a virtual counterpart of a device that has been (pre-)ordered by a user, but not yet delivered and/or installed, and storing that virtual counterpart in a memory of the wireless network system, a virtual version of the ordered device is already present in the system. Upon receiving one or more signals from a newly added device which has been added to the wireless network system, it is determined that the newly added device corresponds to the virtual counterpart that had previously been stored in the memory. This determination is based on a comparison of the device information of the newly added device with the device information of the ordered device. The device information may, for example, comprise information about the type of the device, an identifier of the device, the device capabilities, a manufacturer of the device, an intended location for the device, etc. If the device information of the newly added device corresponds with the device information of the ordered device, the virtual counterpart is associated with the newly added device, such that the newly added device is configured according to the configuration of the virtual counterpart. This provides the benefit that the installation of a device in a wireless (home) network system is improved, both from a user's perspective as from a system perspective.

The virtual counterpart of the ordered device may be configured by a user, for instance via an application running on a personal user device (e.g. a smartphone or a tablet pc). Additionally or alternatively, the virtual counterpart may be pre-configured. The latter is beneficial because the user does not need to (manually) configure the device. The ordered device may for example be configured in the factory, or it may be configured by a professional installer who may "pre-install" virtual devices in a building/space. Then, when the user receives the ordered device, the user may power the device whereupon it is recognized and automatically configured according to the pre-configuration.

The memory may be further configured to store associations between devices and areas, and the method may further comprise:

associating the virtual counterpart of the ordered device with an area based on the device information of the ordered device and/or based on a user input received via a user interface, and storing an association of the virtual counterpart of the ordered device with the area in the memory. The area may already be stored in the memory or it may be created by the user, or it may be created based on the device information of the ordered device. The association between the area (e.g. a room, a space) and the virtual counterpart of the ordered device may be created automatically, for instance based on the type of the device. The ordered device may, for example, be a garden lighting device and may therefore be automatically added to a garden area, which may already be present or which may be created based on the device information of the ordered device. This enables automatic configuration of the ordered device before it has been received/installed. Additionally or alternatively, the association between the area and the virtual counterpart of the ordered device may be based on a user input. This enables a user to configure the ordered device before it has been received/installed.

The memory may be further configured to store associations between devices and device control settings, and the method may further comprise:

associating the virtual counterpart of the ordered device with a device control setting based on the device information of the ordered device and/or based on a user input received via a user interface, and storing an association of the virtual counterpart with the device control setting in the memory. The device control setting may already be stored in the memory or it may be created by the user, or it may be created based on the device information of the ordered device. The association between the device control setting (e.g. a lighting control setting for a lighting device, a sensing routine for a sensor device, a temperature routine for a thermostat, adding the ordered device to a group of devices, etc.) and the virtual counterpart of the ordered device may be created automatically, for instance based on the type of the device. This enables automatic configuration of the ordered device before it has been received/installed. Additionally or alternatively, the association between the device control setting and the virtual counterpart of the ordered device may be based on a user input. This enables a user to configure the ordered device before it has been received/installed.

The device information of the ordered device may comprise an identifier of the ordered device, and the step of generating the virtual counterpart of the ordered device may further comprise associating the identifier of the device with the virtual counterpart of the ordered device, and the device information of the newly added device may comprise an identifier of the newly added device, and the step of comparing the device information of the newly added device with the device information of the ordered device may comprise comparing the identifier of the ordered device with the identifier of the newly added device to determine if the identifier of the ordered device corresponds with the identifier of the newly added device. The identifier of the ordered device may be indicative of the type of the ordered device, and the identifier of the newly added device may be indicative of the type of the newly added device. It may be beneficial if the identifier of the ordered device is known upon ordering the device, or at least during the delivery process before the device is installed. This enables a one-to-one mapping of the newly added device to the virtual counterpart of the ordered device.

Alternatively, in embodiments wherein no identifier of the ordered device is (yet) available, the method may further comprise generating a pseudo-identifier for the ordered device, and the device information of the newly added device may comprise an identifier of the newly added device, and the method further comprises the step of receiving the identifier of the newly added device and replacing the pseudo-identifier of the ordered device with the identifier of the newly added device. Often, the identifier of an ordered device is not yet known because it is not yet known which exact device will be shipped to the user. Thus, only the type of device may be known when ordering of the device. Upon determining that the device information (i.e. at least the type) of the newly added device corresponds with the device information (i.e. at least the type) of the ordered device, the pseudo-identifier may be replaced with the identifier of the newly added device.

The method may further comprise rendering, on a display, a list of devices, the list comprising one or more already installed devices and the ordered device. This is beneficial, because it enables a user to see which devices are already installed in the wireless network system, and the ordered device which has not been added to the wireless network system (yet). Additionally, the method may comprise rendering an indicator on the display for indicating that the ordered device has not been added to the wireless network system, and after the step of storing the association, ceasing rendering the virtual indicator. This is beneficial because the indicator indicates to the user which device has been only virtually added to the wireless network system and which devices have also been added physically to the wireless network system.

The method may further comprise:

receiving a user input indicative of a renaming of the virtual counterpart of the ordered device, and renaming the virtual counterpart of the ordered device based on the user input. This is beneficial because it enables a user to further configure the ordered device before it has been installed.

After the comparison of the device information of the newly added device with the device information of the ordered device, the method may further comprise requesting a user to confirm that the newly added device corresponds with the ordered device, and executing associating the virtual counterpart with the newly added device if the confirmation is positive. Thus, the association only occurs when a user confirms that the newly installed device is actually the ordered device. This is beneficial, especially if multiple devices are being added to the wireless network system. Additionally or alternatively, the user may provide a user input that indicates with which virtual counterpart the newly added device should be associated.

The method may further comprise the step of downloading, installing and/or updating software associated with or required for the virtual counterpart the ordered device. This is beneficial because it enables (automatic) configuration of the virtual counterpart of the ordered device before the newly added device (which corresponds to the ordered device) has been added to the wireless network system.

The newly added device and/or an already installed device may comprise a light source, and the method may further comprise controlling the light source to indicate that the virtual counterpart has been associated with the newly added device. This is beneficial because the user can see that the association was positive and that the association has been performed.

The signal may be received from a device ordering service. This service may be an application running on a device that executes the method, an online device ordering service such as a webpage or a portal, etc.

According to a second aspect of the present invention, the object is achieved by a computer program product comprising computer program code to perform any of the above-mentioned methods when the computer program product is run on a processing unit of the computing device.

According to a third aspect of the present invention, the object is achieved by a system controller for configuring a device that is to be added to a wireless network system, the system controller comprising:

a receiver configured to receive a signal indicative of that the device has been ordered by a user, a processor configured to receive device information about the ordered device, wherein the device information comprises at least information indicative of a type of the ordered device, generate a virtual counterpart of the ordered device based on the device information and to store the virtual counterpart in a memory, receive one or more wireless signals from a newly added device that has been added to the wireless network system, wherein the one or more wireless signals are indicative of device information of the newly added device, wherein the device information of the newly added device comprises at least information indicative of a type of the newly added device, compare the device information of the newly added device with the device information of the ordered device to determine if the device information of the newly added device corresponds with the device information of the ordered device, and, if the device information of the newly added device corresponds with the device information of the ordered device, associating the virtual counterpart with the newly added device.

It should be understood that the computer program product and the system controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
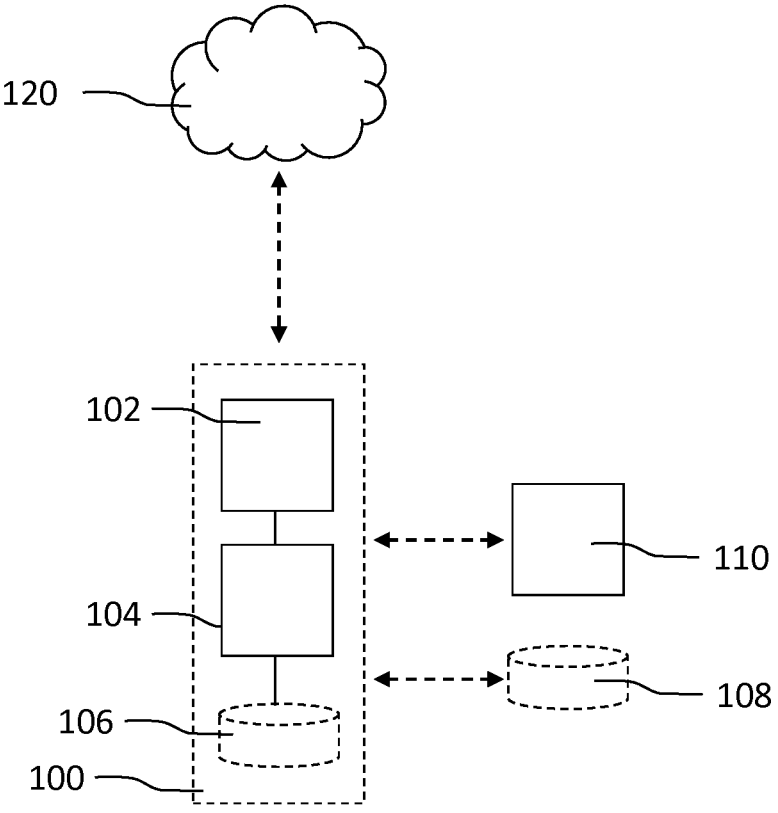
FIG. 1 shows schematically an embodiment of a system controller for configuring a device that is to be added to a wireless network system.

FIG. 1 shows a system controller 100 for configuring a device 110 that is to be added to a wireless network system. The system controller 100 comprises a receiver configured to receive, from a device ordering service 120, a signal indicative of that the device 110 has been ordered by a user. The system controller 100 further comprises a processor 104 configured to receive device information about the ordered device 120, wherein the device information comprises at least information indicative of a type of the ordered device 120. The processor 104 is further configured to generate a virtual counterpart of the ordered device 110 based on the device information, and to store the virtual counterpart in a memory 106, 108. The (not physically existing) virtual counterpart may, for example, be data (e.g. identification data, configuration data, etc.) representative of the (physical) ordered device 110. The processor 104 is further configured to receive one or more wireless signals from a newly added device 110 that has been added to the wireless network system, wherein the one or more wireless signals are indicative of device information of the newly added device. The device information of the newly added device 110 comprises at least information indicative of a type of the newly added device 100. The processor 104 is further configured to compare the device information of the newly added device 110 with the device information of the ordered device to determine if the device information of the newly added device corresponds with the device information of the ordered device, and, if the device information of the newly added device corresponds with the device information of the ordered device, associating the virtual counterpart with the newly added device.

The receiver 102 may be a communication module configured to communicate with a device ordering service, for instance via the internet. The device ordering service may for example be an application running on the system controller or an online device ordering service, such as a webpage or a portal, which enables a user to order devices online for the wireless network system, whereupon the device ordering service may communicate the signal to the receiver 102. The device ordering service may be coupled to a system of a (physical) store, which enables a user to purchase the device 110 in the store, whereupon the device ordering service may communicate the signal to the receiver 102. After the device 110 has been ordered, the processor 104 may generate the virtual counterpart of the device 110. The transmission of the signal from the device ordering service to the receiver 102 or the generation of the virtual counterpart by the processor 104 may, for example, occur immediately after placing the order for the device 110, after payment for the device has been completed, after the device has been dispatched from a distribution center/warehouse, after the user has received the device 110 at home, etc.

The receiver 102 may receive the signal from the device ordering service. The signal is indicative of that the device 110 has been ordered by the user. The signal may be further indicative of device information of the ordered device 110, wherein the device information comprises sufficient information for the device 110, or at least the device type, to be identified. This enables the processor to match a device that is being installed with the ordered device 110.

The device information may, for example, comprise information about a type of the ordered device 110. The ordered device 110 may for example be a lighting device, and the device information may be indicative of the type of lighting device (e.g. a spot light, a wall washer, an LED strip, etc.). The ordered device 110 may for example be a speaker, and the device information may be indicative of the type of speaker (e.g. a subwoofer, a tweeter, a mid-range speaker, etc.). The ordered device 110 may for example be a sensor, and the device information may be indicative of the type of sensor (e.g. a motion/presence sensor, a temperature sensor, a camera, etc.).

Additionally, the device information may, for example, comprise information about a to-be-installed location of the ordered device 110. The device information of the ordered device 110 may for example be indicative that the ordered device 110 is to be installed in the living room, in the garden, etc.

Additionally or alternatively, the device information may comprise information about the device capabilities of the ordered device 110. For instance, the device information of a lighting device may be indicative of the color rendering capabilities of the lighting device, whereas the device information of a sensor may, for example, be indicative of the sensitivity and/or field of view of the sensor. It should be understood that the above-mentioned examples of device information are mere examples, and that the skilled person is able to find other types of device information without departing from the scope of the appended claims.

The processor 104 is configured to generate a virtual counterpart of the ordered device 110 and store that virtual counterpart in the memory 106, 108. The memory 106, 108 may be comprised in the same device as the system controller 100, or be comprised in a remote device and be accessible via a network such as the internet. The memory 106, 108 may be a single memory or a plurality of (distributed) memories. The memory 106, 108 may be configured to store a list of devices that have already been installed (and configured) in the network and a list of to-be-installed devices. The processor 104 may store a device identifier for the ordered device 110 in the memory 106, 108. The device information of the ordered device 110 may comprise a (unique) identifier of the ordered device 110. Alternatively, the processor 104 may generate a pseudo (temporary) identifier for the ordered device 110. The latter may be beneficial if only the type of the ordered device 110 is known, and the unique identifier (e.g. a serial number) of the ordered device 110 is unknown. When a device 110 of the same type is later installed in the wireless network system, the processor 104 may then replace the pseudo-identifier with the unique identifier of the installed device 110.

The processor 104 is configured to receive one or more wireless signals from a newly added device 110 that has been added to the wireless network system. This signal may be received via the receiver 102, or via a communication module for receiving the one or more wireless signals from the newly added device 110. Various wireless protocols may be used. The wireless network system may be a ZigBee, Bluetooth, Wi-Fi, thread, etc. system, or a hybrid system. The one or more one or more wireless signals that are received from the newly added device 110 are indicative of device information of the newly added device. The device information of the newly added device comprises at least information indicative of a type of the newly added device. This is similar to the device information of the ordered device 110. The processor 102 then compares the device information of the newly added device 110 with the device information of the ordered device to determine if the device information of the newly added device corresponds with the device information of the ordered device. If this is the case, the processor associates the virtual counterpart of the ordered device with the newly added device 110, and the processor 102 may store this association in the memory 106, 108. If this is not the case, the processor 102 may add the newly added device to the wireless network system as a new device, or the processor 102 may prompt the user (e.g. via a user interface) to confirm that the newly added device is not the same as the ordered device.

Figure 2:
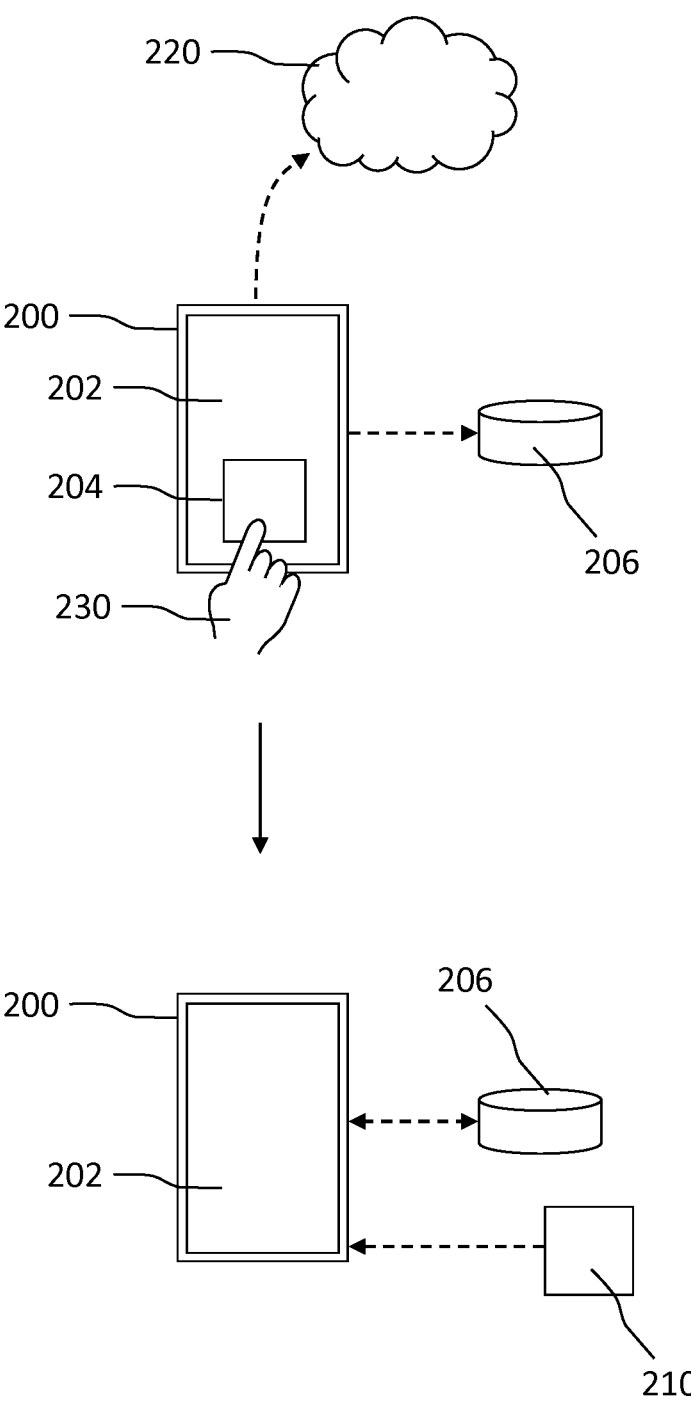
FIG. 2 shows schematically two steps of using a mobile device for ordering a device adding a device to a wireless network system.

FIG. 2 illustrates an example of how a user may order a device 210 using a mobile device 200. The mobile device 200 (e.g. a smartphone, a tablet pc, etc.) may comprise a user interface 202 (e.g. a display) via which the user may order the device 204. FIG. 2 (top) illustrates a virtual representation of the ordered device 204 on the display 202, and a physical representation of the to-be-installed device 210 (bottom). A user may select 230 and order the device 204 via an application that runs on the mobile device 200. Upon ordering the device, the receiver 102 (not shown in FIG. 2) may receive a signal (e.g. a confirmation) from the device ordering service indicative of that the device 204 has been ordered and communicate this to processor 104 (not shown in FIG. 2). The processor 104 may also receive the confirmation that the device 204 has been ordered directly from the application running on the mobile device 200. Upon receiving the indication that the device has been ordered, the processor may receive device information about the ordered device 204, for instance that the ordered device is a lighting device (e.g. a light bulb configured to emit colored light). Then, the processor 104 may generate a virtual counterpart (e.g. a virtual lighting device) of the ordered device based on the device information and store the virtual counterpart in a memory 206. In the example of FIG. 2, the memory 206 is a remote memory, for instance located in a central lighting control system (e.g. a bridge). After a while, the user may receive the device 210 at home and power it, whereupon the device (e.g. a light bulb configured to emit colored light) announces itself in the wireless network system. The device may communicate to the processor 104 that it is a light bulb configured to emit colored light, and the processor 104 may then associate the newly added device 210 with the virtual counterpart. This association may be stored in the memory 206, such that the virtual counterpart has been replaced by the actual device. In the example of FIG. 2, the mobile device 200 is used for ordering the device 204 and for adding the device 210 to the wireless network. It should be understood that the ordering of the device may be executed by a primary device (e.g. a smartphone, a pc, etc.), and that the reception of the signal and the adding of the device may be executed by a secondary device (e.g. a central system controller, a different smartphone, a bridge, etc.).

Figure 3:
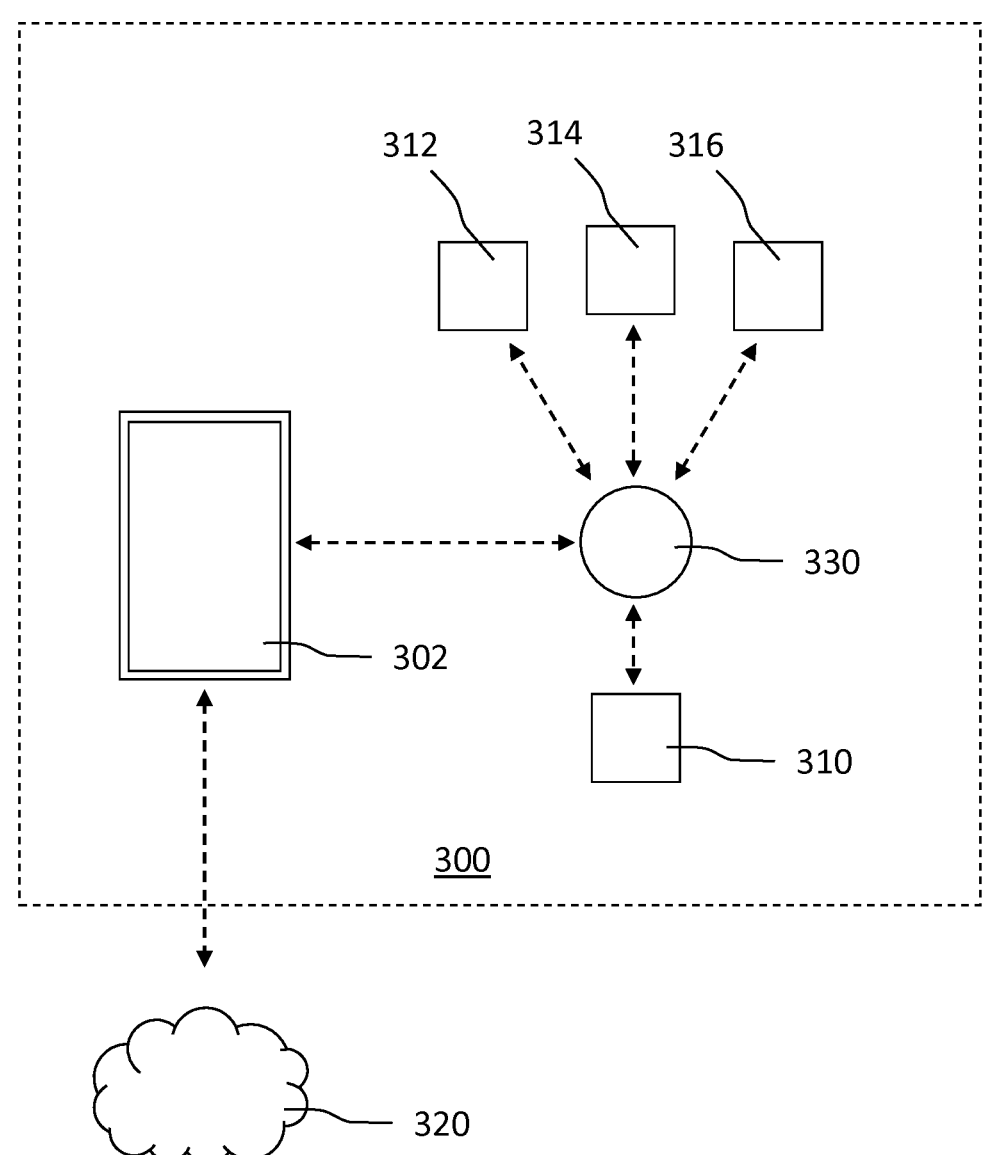
FIG. 3 shows schematically an embodiment of a wireless network system for configuring a device that is to be added to the wireless network system.

FIG. 3 illustrates an example of a wireless network system 300 comprising a mobile device 302, a plurality of already installed devices 312, 314, 316, a central control device 330 for controlling the already installed devices 312, 314, 316 and a to-be-installed device 310 that has been ordered by a user via the mobile device 302. The user may order the new device 310 via an online device ordering service 320 via the internet, whereupon the processor of the mobile device stores a virtual counterpart of the device 310 in the central control device 330 (e.g. a bridge). Later, when the user has received and powered the newly added device 310, the central control device 330 may detect the presence of the newly added device 310 and replace the virtual counterpart with the newly added device 310. The devices 310, 312, 314, 316 of the wireless network system 300 may then be controlled by the central control device 330, either based on control settings stored in the central controller 330 or based on control signals received from, for instance, the mobile device 302.

The device 110 may be any type of device that can be added to a wireless network system. The device 110 may, for instance, a lighting device to be added to a wireless lighting system, a speaker to be added to a wireless speaker system, a sensor to be added to a wireless home/office system, a smart speaker to be added to a wireless home/office system, etc.

The system controller 100 may be a controller of the wireless network system. The system controller 100 may be comprised in a mobile device, such as a smartphone. Alternatively, the system controller 100 may be comprised in a hub, a router or a bridge device. Alternatively, the system controller 100 may be comprised in a remote device that may communicate with the wireless network system, for instance via the internet.

The memory 106, 108 may be further configured to store associations between devices and areas (e.g. areas in an environment or a space such as a building, a house, an outdoor location, etc.). The memory 106, 108 may, for example, store associations between lighting devices of the wireless network system and locations where these lighting devices are installed (e.g. lighting device 1 in the living room and LED strip 1 in the bedroom). The processor 104 may be further configured to associate the virtual counterpart of the ordered lighting device with an area. The processor 104 may determine this association based on the device information and store the association in the memory 106, 108. The device information may be indicative of that a newly added lighting device is garden lighting, and the processor 104 may therefore add the newly added lighting device to a garden area. Additionally or alternatively, the processor 104 may determine this association based on a user input received via a user interface. This enables a user to associate the ordered lighting device with an area before the ordered lighting device has been installed in the wireless network system.

The memory 106, 108 may be further configured to store associations between devices and device control settings. The memory 106, 108 may, for example, store associations between lighting devices of the wireless network system and light scenes. A light scene is indicative of lighting control settings for one or more lighting devices. The processor 104 may be further configured to associate the virtual counterpart of the ordered device with a device control setting and store this association in the memory 106, 108. The processor 104 may determine this association based on the device information. The processor 104 may for example determine, based on the device information, that an ordered lighting device is a lamp for emitting colored light, and therefore associate the lighting device with a colored light scene. The processor 104 may also, for example, determine that an ordered (lighting) device has similarities (e.g. same type, same desired/target location, etc.) with already installed devices, and the act of associating the virtual counterpart with the control setting may comprise adding the ordered device to a group of (similar) already installed devices. Additionally or alternatively, the processor 104 may determine this association based on a user input received via a user interface. This enables a user to, for example, associate an ordered lighting device with a new or already existing light scene before the ordered lighting device has been installed in the wireless network system, and/or to group the ordered (lighting) device with already installed devices.

Figure 4:
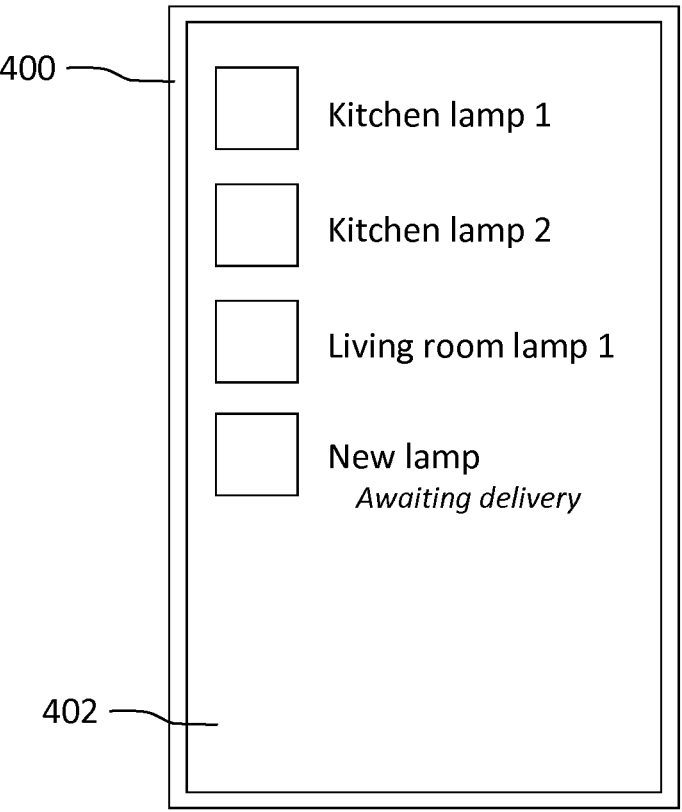
FIG. 4 shows schematically an embodiment of a display showing a list of devices added and to-be-added to a wireless network system.

The processor 104 may be further configured to render, on a display, a list of devices, the list comprising one or more already installed devices and the ordered device 110. FIG. 4 illustrates an example of such a list rendered on a display 4000 of a mobile device 402. In this example, the three lighting devices (Kitchen lamp 1 and 2 and Living room lamp 1) have already been installed in the wireless network system, and "New lamp" has been ordered by the user, but not yet installed. The processor 104 may be further configured to render an indicator on the display for indicating that the ordered device 110 has not been added to the wireless network system. The indicator may, for example, be an icon, text, a certain (text) color of the ordered device, etc. This is illustrated in FIG. 4, wherein the text "Awaiting delivery" indicates that the "New Lamp" has not yet been added to the wireless network system. The processor 104 may be further configured to cease rendering the virtual indicator after the association between the virtual counterpart and the newly added device has been stored in the memory 106, 108.

The processor 104 may be further configured to receive a user input indicative of a renaming of the virtual counterpart of the ordered device 110. The user input may, for example, be received via a touch-sensitive display of a mobile device, the user input may be a voice input received via a microphone, etc. The processor 104 may be further configured to rename the virtual counterpart of the ordered device based on the user input. This enables a user to change the name of the ordered device 110 (e.g. form "new lamp" to "living room lamp 2", see FIG. 4).

The processor 104 may be further configured to request a user to confirm that the newly added device corresponds with the ordered device 110. The processor 104 may prompt the user to provide this confirmation, for instance via a user interface. The processor 104 may be further configured to generate the association between the virtual counterpart and the newly added device if the confirmation is positive.

The processor 104 may be further configured to download, install or update the software/firmware for the ordered device 110 or for any other device in the wireless network system associated with the ordered device (e.g. a bridge, a controller, an application running on a control device, etc.). The processor 104 may receive or request the new software after receiving the signal indicative of that the device 110 has been ordered, when the new (updated) software becomes available, upon receiving a user input, etc. This is beneficial, because the software of the ordered device 110 will be up to date when the ordered device 110 arrives at the user and is installed by the user.

Figure 5:
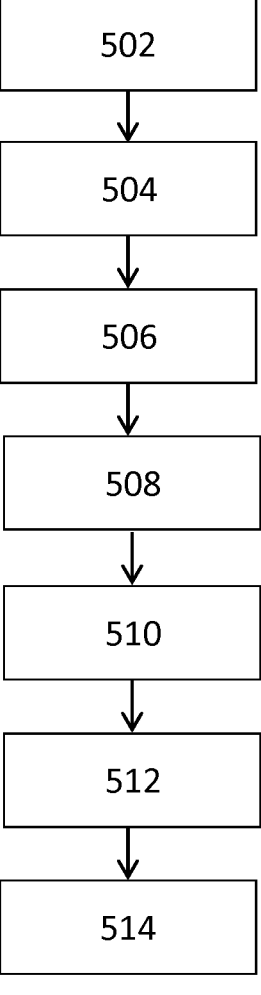
FIG. 5 shows schematically a method of configuring a device that is to be added to a wireless network system.

FIG. 5 shows schematically a method 500 of configuring a device that is to be added to a wireless network system. The method 500 comprises receiving 502 a signal indicative of that the device has been ordered by a user, receiving 504 device information about the ordered device, wherein the device information comprises at least information indicative of a type of the ordered device, generating 506 a virtual counterpart of the ordered device based on the device information, storing 508 the virtual counterpart in a memory, receiving 510, at a system controller of the wireless network system, one or more wireless signals from a newly added device that has been added to the wireless network system, wherein the one or more wireless signals are indicative of device information of the newly added device, wherein the device information of the newly added device comprises at least information indicative of a type of the newly added device, comparing 512 the device information of the newly added device with the device information of the ordered device to determine if the device information of the newly added device corresponds with the device information of the ordered device, and if the device information of the newly added device corresponds with the device information of the ordered device, associating 514 the virtual counterpart with the newly added device.

The method 500 may be executed by computer program code of a computer program product when the computer program product is run on a processing unit of a computing device, such as the processor 104 of the system controller 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of configuring an ordered device that is to be added to a wireless network lighting system, wherein the ordered device is a light emitting device, the method comprising:

receiving, by a receiver, a signal indicative of that the ordered device has been ordered by a user, receiving, by a processor, device information about the ordered device, wherein the device information comprises at least information indicative of a type of the ordered device, generating, by the processor, a virtual counterpart of the ordered device based on the device information, generating a pseudo-identifier for the ordered device, storing, by the processor, the virtual counterpart in a memory, downloading, installing and/or updating software for pre-existing devices on the wireless network system associated with the ordered device in response to the signal indicating that the ordered device has been ordered by the user;

receiving, at a system controller of the wireless network system, one or more wireless signals from a newly added device that has been added to the wireless network system, wherein the one or more wireless signals are indicative of device information of the newly added device, and the device information of the newly added device comprises at least information indicative of a type of the newly added device and an identifier of the newly added device, comparing, by the processor, the device information of the newly added device with the device information of the ordered device to determine if the device information of the newly added device corresponds with the device information of the ordered device, requesting, by the processor, a user to confirm that the newly added device corresponds with the ordered device after comparing the device information, and associating, by the processor, the virtual counterpart with the newly added device if the confirmation is positive, if the device information of the newly added device corresponds with the device information of the ordered device and if the confirmation is positive, associating, by the processor, the virtual counterpart with the newly added device, replacing, by the processor, the pseudo-identifier of the ordered device with the identifier of the newly added device, and associating, by the processor and before the newly added device has been added to the wireless network, (i) the virtual counterpart of the ordered device with an area based on the device information of the ordered device and/or based on a user input received via a user interface, and storing an association of the virtual counterpart of the ordered device with the area in the memory, and/or associating, by the processor and before the newly added device has been added to the wireless network, (ii) the virtual counterpart of the ordered device with a device control setting based on the device information of the ordered device and/or based on a user input received via a user interface, wherein the device control setting is a lighting control setting, and storing an association of the virtual counterpart with the device control setting in the memory.

2. The method of claim 1, wherein the device information of the ordered device comprises an identifier of the ordered device, and wherein the step of generating the virtual counterpart of the ordered device further comprises associating the identifier of the device with the virtual counterpart of the ordered device, and wherein the device information of the newly added device comprises an identifier of the newly added device, and wherein the step of comparing the device information of the newly added device with the device information of the ordered device comprises comparing the identifier of the ordered device with the identifier of the newly added device to determine if the identifier of the ordered device corresponds with the identifier of the newly added device.

3. The method of claim 1, further comprising:

rendering, on a display, a list of devices, the list comprising one or more already installed devices and the ordered device.

4. The method of claim 3, further comprising rendering an indicator on the display for indicating that the ordered device has not been added to the wireless network system, and after the step of associating the virtual counterpart with the newly added device, ceasing rendering the virtual indicator.

5. The method of claim 1, further comprising the step of downloading, installing and/or updating software associated with the virtual counterpart of the ordered device.

6. The method of claim 1, wherein the newly added device and/or an already installed device comprises a light source, wherein the method further comprises controlling the light output of the light source to indicate that the virtual counterpart has been associated with the newly added device.

7. The method of claim 1, wherein the signal is received from a device ordering service.

8. A non-transitory computer readable medium comprising computer program code to perform the method of claim 1 when the computer program code is run on one or more processors.

9. The method of claim 1, further comprising:

receiving a user input indicative of a renaming of the virtual counterpart of the ordered device, and renaming the virtual counterpart of the ordered device based on the user input.

\* \* \* \* \*